March 17, 1970  V. E. JOHNSON, JR., ET AL  3,500,783

STABLE OCEAN PLATFORM

Filed July 16, 1968  5 Sheets-Sheet 1

INVENTORS
VIRGIL E. JOHNSON, JR.
JOHN O. SCHERER, JR.
EUGENE R. MILLER, JR.
VIGGO A. BLAES

*Finnegan, Henderson & Farabow*
ATTORNEYS

March 17, 1970 V. E. JOHNSON, JR., ET AL 3,500,783
STABLE OCEAN PLATFORM
Filed July 16, 1968 5 Sheets-Sheet 2
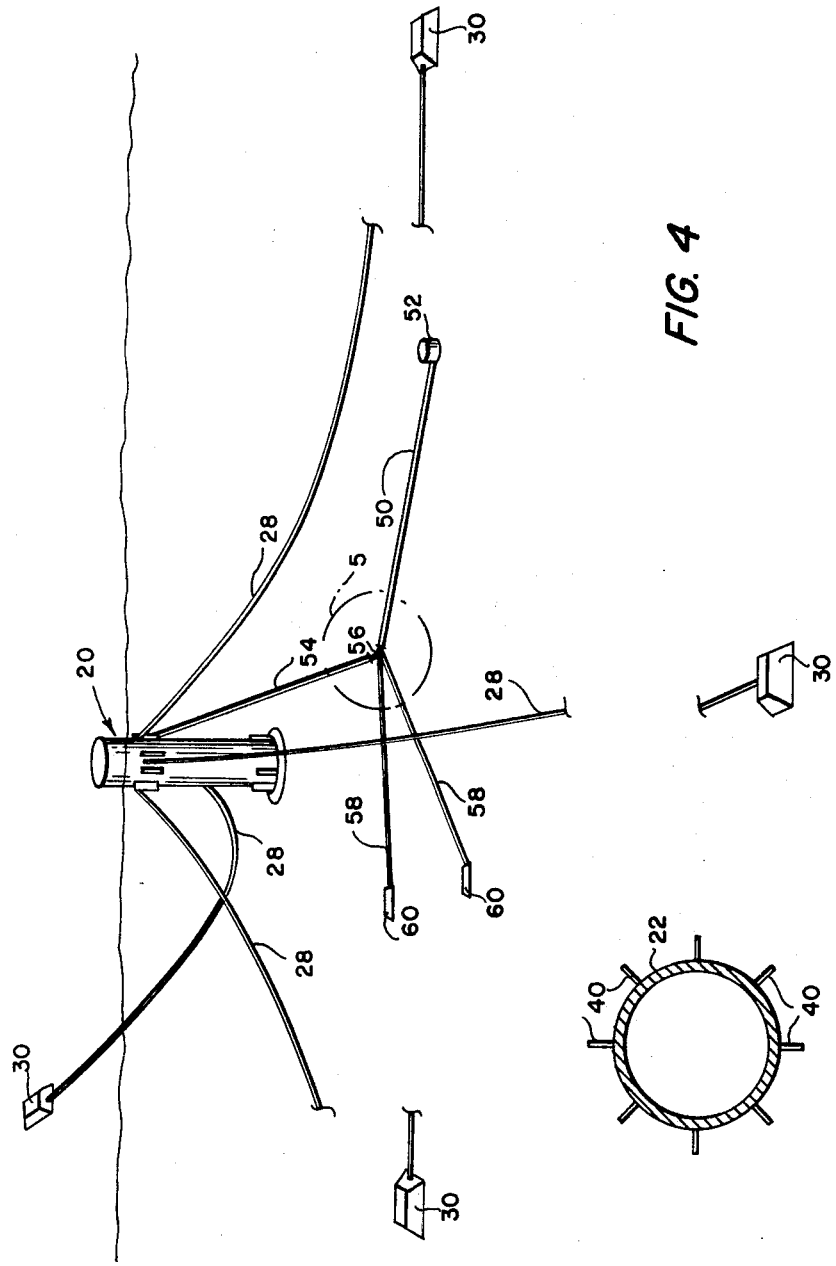
INVENTORS
VIRGIL E. JOHNSON, JR.
JOHN O. SCHERER, JR.
EUGENE R. MILLER, JR.
VIGGO A. BLAES
Finnegan, Henderson & Farabow
ATTORNEYS

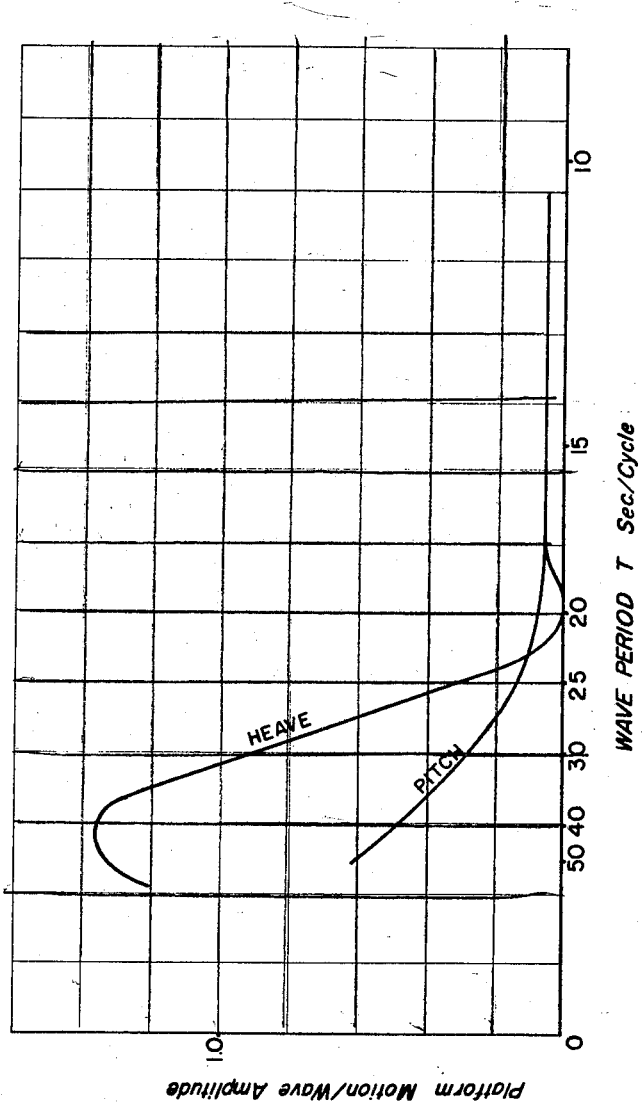

United States Patent Office 3,500,783
Patented Mar. 17, 1970

1

3,500,783
STABLE OCEAN PLATFORM
Virgil E. Johnson, Jr., Gaithersburg, John O. Scherer, Jr., Laurel, Eugene R. Miller, Jr., Annapolis, and Viggo A. Blaes, Pikesville, Md., assignors to Hydronautics, Inc., Laurel, Md., a corporation of Maryland
Filed July 16, 1968, Ser. No. 745,285
Int. Cl. B63b *35/44, 21/50;* E21b *15/02*
U.S. Cl. 114—.5                                           6 Claims

ABSTRACT OF THE DISCLOSURE

A stable, floating marine platform is provided having a natural period of oscillation greater than the period of the waves of maximum energy to which the platform may be exposed. A plurality of vertically and radially extending damping plates are circumferentially spaced around the upper and lower submerged portions of the platform, and a horizontal damping plate is secured to the bottom of the platform to prevent resonance oscillation of the platform. A stabilized, flow line system is also provided for maintaining fluid connection between the platform and an underwater well head under all sea conditions. The system includes an upper, substantially vertically disposed flow line and a lower, substantially horizontally disposed flow line that are connected in fixed angular relationship, said connection being moored at a point laterally spaced from the platform to maintain the flow lines in the form of stiffened catenary curves.

This invention relates to stable ocean platforms suitable for oil well drilling, petroleum production and storage, communication facilities, satellite observations, and the like. More particularly, this invention relates to an inherently stabilized floating marine platform for offshore petroleum production and storage, and a flow line system for the platform that remains with an underwater well head under all sea conditions.

As the search for oil extends further offshore into deeper and deeper water, it becomes increasingly difficult to provide bottom-supported platforms to conduct the necessary drilling and production operations. The cost of such platforms not only are prohibitive, but their safety is questionable.

Floating platforms have more recently been used in attempts to avoid the disadvantages adherent in bottom-supported platforms. For such platforms to be capable of carrying out the drilling, oil production, and other offshore operations, they must be relatively stable despite the motions of the sea. By stable, as used throughout the specification and claims, is meant a platform having a minimum of translational and angular motion so that it is habitable at all times and that all necessary operations can be carried out under even the most severe sea conditions.

Floating facilities that have been provided in the past, however, have not proven entirely satisfactory. These facilities, for example, generally have low stability and the fluid connection to well head is susceptible to rupture even under moderate sea conditions and especially under resonance conditions. Further, many of the platforms and the mooring systems heretofore provided in attempts to improve the stability and well head connection have either been too complex or too costly to be practical.

Accordingly, a primary object of this invention is to provide a new and improved floating marine platform that remains sufficiently stable to be habitable and operational under all sea conditions.

2

Yet another object of this invention is to provide a floating marine platform having means for preventing resonance oscillation of the platform.

Still another object of this invention is to provide a stabilized floating marine platform that avoids large dynamic loads on the mooring system.

A further object of one embodiment of this invention is to provide a new and improved flow line system for connecting a floating marine platform to a well head, which system is not subject to rupture despite the motions of the platform under the most severe sea conditions.

In accordance with the objects, this invention provides a stabilized floating marine platform comprising an elongated, substantially symmetrical hull of draft such that its lower portion is below the zone of significant vertical wave motion, and of a size such that its natural period of oscillation in pitch and heave is greater than the period of the waves of maximum energy to which the platform may be exposed.

A plurality of upper and lower vertical damping plates are provided that are spaced around and extend in a radial direction from at least a portion of the submerged upper and lower side walls of the hull. A horizontal damping plate is also provided that extends radially outward from the lower portion of the hull. The plates dampen pitching and heaving motions of the platform caused by waves having a period at or near the natural periods of oscillation of the platform so that resonant motion cannot occur.

In accordance with another embodiment of this invention, a stabilized, flow system is provided for connecting a floating marine platform to an underwater well head, which system comprises a lower, flexible fluid flow line substantially horizontally disposed and bending upward from the well head, and an upper, flexible fluid flow line substantially vertically disposed and extending downwardly from the platform.

In accordance with the invention, means are provided for connecting the upper end of the lower flow line to the lower end of the upper flow line in angular relationship, and mooring means are provided for maintaining the connection at a point laterally spaced from the platform to maintain the flow lines in the form of stiffened catenary curves. Preferably, the upper flow line is connected to the platform through a coil of flow line that has a degree of flexure sufficient to accommodate angular motion of the platform realtive to the flow line.

It is to be understood that both the foregoing general description and the following detailed description are exemplary and explanatory but are not restrictive of the invention.

The accompanying drawings which are incorporated in and constitute a part of this specification, illustrate an embodiment of the invention and together with the description, serve to explain the principles of the invention.

Of the drawings:

FIG. 3 is a sectional view taken along the line 3—3 of FIG. 1;

FIG. 4 is a perspective view showing the mooring and flow line system for the platform;

FIG. 10 is a chart showing the response of the platform of this invention in pitch and heave under all wave periods.

Figure 1:
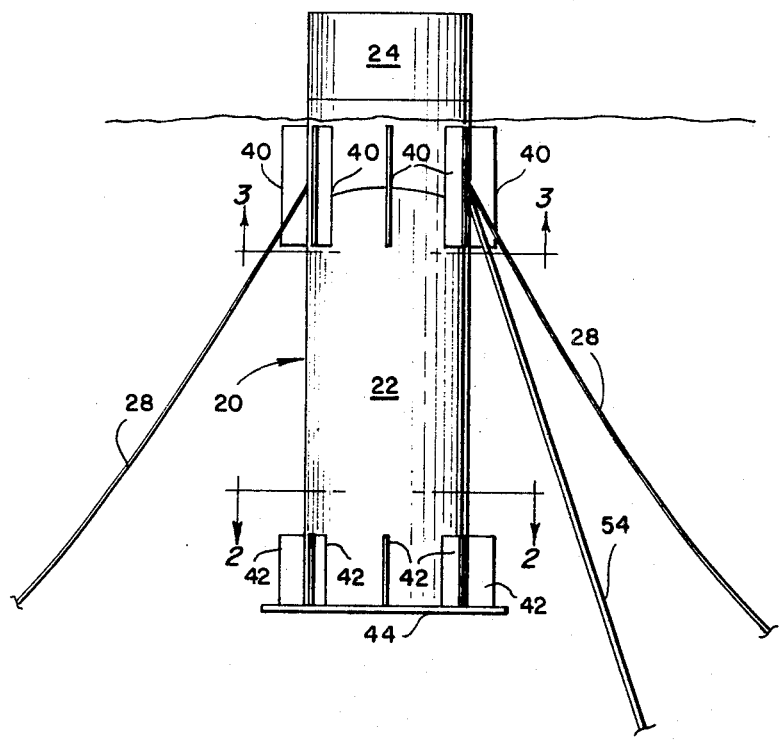
FIG. 1 is an elevational view showing the floating marine platform of this invention.
Figure 2:
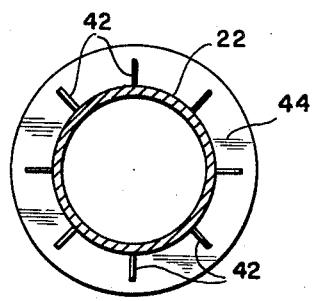
FIG. 2 is a sectional view taken along the line 2—2 of FIG. 1.

Reference will now be made in detail to the present preferred embodiments of the invention, examples of which are illustrated in the accompanying drawings.

For the purposes of clarity and simplification, only those parts of a floating marine platform which are essential to an understanding of the stabilizing and flow line system of this invention have been illustrated in the drawings.

With reference to FIG. 1, the floating marine platform of this invention, generally indicated as 20, is an elongated, right circular cylinder having a hull 22 of substantially constant cross-sectional area and a production and crew facility area 24. Hull 22 is internally closed at each end and is divided into a plurality of compartmented petroleum storage tanks. The storage tanks can be filled with either sea water or petroleum, the petroleum displacing the sea water as it is pumped into the tanks.

As shown in FIG. 4, platform 20 is conventionally moored at the desired location with a plurality of chain or steel rope mooring lines 28. Mooring lines 28 are attached to the platform sufficiently below the water line of the hull to prevent them from being damaged by vessels approaching the platform. The lines are anchored to the ocean floor at 30 and are of a length sufficient to define a caternary curve from the ocean floor to the platform. Preferably, the mooring lines are circumferentially spaced around the platform but their exact location may vary depending upon the existence of prevailing ocean currents, as is well known to those skilled in the art.

Since the lines are in a form of a caternary curve, they are continuously in tension and, therefore, lateral movements of the platforms caused by wave action, wind, and/or current, are resisted by the tension in the lines. The spring tension of the lines, however, is selected so that the expected lateral movements or surge of the platform can occur without placing undue stress on the mooring system. The mooring lines, therefore, are not used to prevent lateral oscillation but to prevent drifting of the platform away from the desired location.

In accordance with this invention, a moored and floating marine platform is provided that is inherently stabilized under all sea conditons so as to remain continuously habitable and operational.

In the open sea, the period or wave length of expected oscillatory waves vary considerably from short periods to very long periods of over 50 seconds. Generally, however, ovean waves are irregular, and while a continuous spectrum of all wave periods is therefor present at any one time, certain wave periods are predominant depending upon the conditions of the sea. Since waves at the predominant period are the most numerous, these waves have the highest energy, and hence the greatest influence on the movement of a floating body. Under seat state 5, for example, the period of waves of the highest energy is around 10 seconds, while under sea state 8, the period of waves of the highest energy is around 25 seconds.

As the oscillatory waves strike a floating body, various motions are imparted to the body and the motions increase with increasing wave energy. Typical of the motions imparted to a floating body by oscillatory waves are heaving (vertical motion), pitching (angular motion), and surging (lateral motion).

Considering the response of a floating body, it can be seen that if the natural period of oscillation of a floating body is at or near the period of the waves of highest energy striking the platform at any given time, that resonance will occur and motions become so violent that the platform will be totally useless. Thus, it is desirable to provide a platform in which the natural period of oscillation of the body is considerably in excess of the period of the wave of maximum energy to which a floating marine platform may be exposed in the open sea. The period of waves of maximum energy is generally around 22 seconds, which are the predominant wave periods under hurricane conditions.

In accordance with this invention, therefore, the platform is constructed to that its natural period of oscillation is considerably in excess of the period of waves of maximum energy to which the body may be exposed. As is well known to those skilled in the art, the larger the mass of the body including the mass of the body and the mass of the added fluid, the slower will be its response; and hence the longer its natural period of oscillation. Balancing this of course will be the restoring forces derived from the displacement of the body by the motion of the sea from its resting displacement and its mooring system.

By way of example, and without any intention to be limited thereto, a floating marine platform having a hull diameter of about 100 feet, a total length of about 480 feet, and a fluid storage capacity of 70,000 tons has a draft of about 380 feet when filled with oil and 430 feet when filled with seat water, and a natural period of oscillation of around 50 seconds in pitch and 30 seconds in heave, both of which are well in excess of the period of waves expected that contain a maximum amount of energy. It will be understood, of course, that platforms of other length and widths can be constructed in a manner well known to those skilled in the art so that their natural period of oscillation is above 22 seconds.

As stated above, however, the ocean presents a continuous spectrum of all wave periods and thus there exists at all times some waves having a period at or close to the natural oscillation period of the body, although the energy of such waves may nat be as great as the energy of the waves at the lower and predominant wave period. Resonance conditions, therefore, can still exist even though the platform has a natural period in excess of the predominant wave periods that can be expected.

In accordance with this invention, therefore, damping means are provided on the platform to dampen oscillatory motions of the platform caused by waves at or near its natural period of oscillation so that such resonance cannot occur. As embodied and as shown in FIG. 1, this means comprises a plurality of upper and lower vertical damping plates 40 and 42, respectively, that extend in a radial direction from the submerged upper and lower side walls of hull 22. Preferably, the upper edges of upper plates 40 are adjacent the still water line of the hull so that these plates are normally submerged at all times.

Upper and lower damping plates 40 and 42 act in combination to dampen pitching motion of the platform induced by waves having a wave period at or near the natural period of oscillation of the platform. When the platform pitches in response to wave action, it pitches about a center which varies up and down the height of the body depending on the wave period of the predominant waves striking the body. With predominant waves of relatively short wave lengths, the pitch center is low on the body so that the angular motion of the upper part of the body is greater than its lower portion. As the predominant wave lengths increase, the pitch center rises until with very long waves, the angular motion of the bottom portion of the hull is greater than the upper portion.

In accordance with this invention, therefore, it is necessary to provide damping plates at both ends of the hull and these plates should be located at a maximum distance from the center of the hull but still submerged to maximize the damping effect.

Vertical damping plates 40 and 42 are sized to provide near critical damping of the angular motion of the platform. Since the plates, however, increase the cross-sectional area of the platform exposed to sea currents, their size should be minimized to reduce current load on the mooring system.

In the embodiment described above, eight (8) lower and eight (8) upper plates are provided that are equally spaced around the circumference of the hull. The plates are rectangular and measure 12.5 feet in a radial direction, 100 feet in length for upper plates 40, and 50 feet in length for lower plates 42.

In accordance with the objects of this invention, a horizontal damping plate 44 is further provided that extends radially outward from the lower portion of the hull. Preferably, damping plate 44 is a flat, circular plate that is secured to the bottom of hull 22.

The horizontal damping plate dampens heaving or vertical motion of the platform caused by waves oscillating at or near the natural period of oscillation of the platform to prevent the occurrence of resonance conditions. While the damping effect would be achieved with the horizontal plate at any level, the plate has a large surface area that could be acted upon by the vertical component of the orbital motion of waves. Thus, the plate should be located below the zone of significant vertical orbital wave motion and preferably near the bottom of the hull so as to be uneffected by surface wave energy.

Similarly, horizontal damping plate 44 is sized to provide near critical damping of the vertical motion of the platform.

In the embodiment described above, horizontal damping plate 44 extends radially outward a distance of about 50 feet from the side wall of hull 22.

In verification of the foregoing, model tests were carried out using a cylindrical float scaled for a 70,000-ton capacity, with a model scale of 240 to 1, and sufficient ballast to duplicate full scale displacement levels. The platform had a natural period of 30 seconds in heave and 50 seconds in pitch without damping plates and in still water, both of which are well in excess of the maximum expected encounter period (22 seconds) of ocean waves containing a maximum amount of energy.

Scale damping plates were added to the model and the model was moored in a test basin at a scaled mooring depth of approximately 960 feet with four (4) quadrantly spaced mooring cables in the form of catenary curves. Prototype waves throughout the whole spectrum of wave lengths were generated and caused to impinge the model.

FIG. 10 is a chart of the test data obtained in this experiment. With reference to this figure, it can be seen, for example, that while the heaving of the platform increased with increasing wave periods, resonant heaving at or near the natural period of the model was prevented by the horizontal damping plates which limited vertical movement to one and one half times wave height.

It should be remembered that the test waves are regular waves and that under test conditions waves at the natural period were made to constantly impinge upon the model. Ocean waves are irregular, however, and while natural period waves are present and must be accounted for, the highest wave energy to which the platform may be exposed are at much lower periods. Periods of 22 seconds, for example, are the period of waves of maximum energy that may be expected, since these are the predominant waves under hurricane conditions. With reference to FIG. 10, it can be seen that under these conditions, heaving was limited to about 20% of wave height.

Similarly, the pitch of the model increased with increasing wave height, but resonance conditions were prevented at or near the natural period of the model.

At all wave periods, therefore, the tests conclusively demonstrate that the heave and pitch response of the model platform was sufficiently small to permit continuous habitation and operation of the platform under all possible sea conditions.

Further, the damping plates of this invention prevented heave or pitch resonance from occurring when the wave period coincided with the natural period of the platform.

In accordance with a further embodiment of this invention, there is provided a stabilized, flow line system for connecting a floating marine platform to a well head on the bottom of the ocean floor. As embodied, and as shown in FIG. 4, this system comprises a lower, flexible fluid flow line 50 substantially horizontally disposed and bending upwardly from a well head 52 and an upper, flexible fluid flow line 54 substantially vertically disposed and extending downwardly from platform 20.

Figure 5:
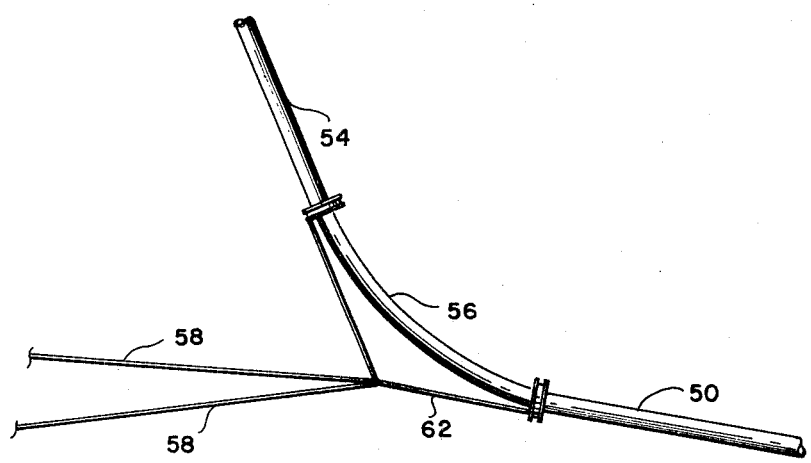
FIG. 5 is a detail taken within the circle 5 of FIG. 4 and showing the connection between the upper and lower flow lines when the underwater well head is laterally spaced a distance from the platform.

The system also includes flow line connecting means for connecting the upper end of lower flow line 50 to the lower end of upper flow line 54 in angular realtionship. As embodied and as shown in FIG. 5, the connecting means comprises a rigid elbow 56 that connects the upper and lower flow line in obtuse angular relationship and above the ocean floor.

Mooring means are further provided to hold the connecting means at a location laterally spaced from the platform to maintain the flow lines in the form of stiffened catenary curves. As embodied, this means comprises a pair of mooring lines 58, suitably anchored to the ocean floor at 60 and a bridle 62, the ends of which are attached to elbow 56 at the junction between the elbow and the respective flow lines. The two (2) ends of bridle 62 are proportioned so that they meet the flow lines tangentially to eliminate bending moments in the flow lines arising from tension on mooring lines 58. The purpose of mooring lines 58 is to keep flow lines 50 and 54 under sufficient tension so that they are maintained in the form of a stiffened catenary, but flexible enough to allow for vertical and lateral movement of the platform in response to wave action. In addition, the mooring means restrains the flow lines against the forces arising from currents in the sea.

Figure 6:
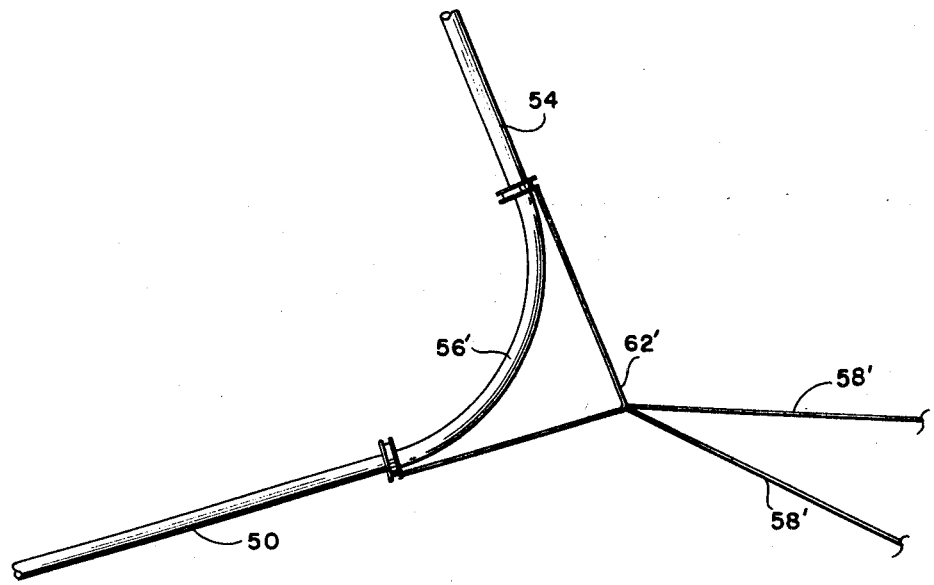
FIG. 6 is a view similar to FIG. 5 and showing the connection between the upper and lower flow lines when the underwater well head is substantially beneath the platform.

As shown in FIG. 4 where well head 52 is spaced laterally a significant distance from platform 20, elbow 56 connects upper and lower flow lines 54 and 50, respectively, in such a manner that an obtuse angle is formed between the lines. Alternatively, and as shown in FIG. 6, when the well head is located substantially beneath the platform, elbow 56' is constructed so that an acute angle is formed between the upper and lower flow lines. In this embodiment, mooring lines 58' extend in an opposite direction from the well head to maintain tension in the flow lines in a manner similar to the embodiment shown in FIGS. 4 and 5.

While only a single flow line system has been illustrated in the drawings, it is to be understood that a plurality of flow lines may be constructed in accordance with this invention and incorporated with a single floating platform.

Figure 7:
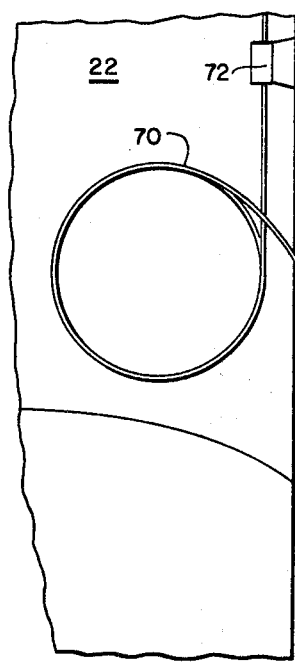
FIG. 7 is a detail of a flexible flow line coil for connecting the upper flow line to the platform.

To provide for pitching motion of the platform relative to the flow lines, flexible connecting means are provided for connecting upper flow line 54 to the platform. As embodied and as shown in FIG. 7, the flexible connecting means comprises a helical coil 70 of flow line having a substantially horizontal axis and a degree of flexure greater than the maximum expected angular movement of platform 20 relative to flow line 54. One end of helical coil 70 is connected to hull 22 of platform 20 at 72 which, in turn, is connected to the pumps (not shown) and the other end of coil 70 through connection 74 to flow line 54. As platform 20 pitches in response to wave action, coil 70 flexes and thereby prevents rupture between the pipe line and the platform. The invention thus provides a means for connecting the flow line to the hull that permits movement of the hull relative to the flow line without the use of moving parts, such as would be found in a universal or swivel type of connections that are easily susceptible to damage or plugging.

In the preferred embodiment of this invention and to relieve tension on coil 70 from the weight of the flow line system, a tension link 76 is provided having its lower end secured to connection 74 and its upper end pivotally connected at 80 to hull 22. The link may be of any suitably form, such as a chain cable or bar. Link 76 permits connection 74 between coil 70 and flow line 54 to swing through an arc about point 80 and accommodate angular motion of platform 22 relative to flow line 54 while continuously supporting the flow line and maintaining the connection between it and coil 70.

Figure 8:
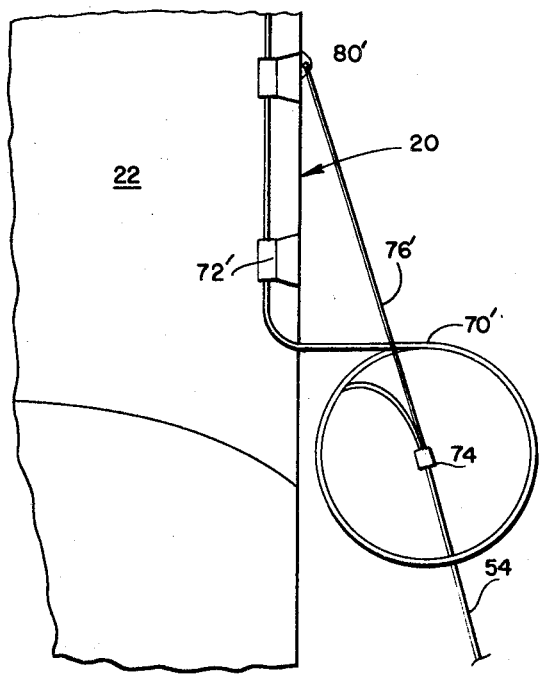
FIG. 8 is a view similar to FIG. 7 and showing an alternative flow line coil.

Alternatively, the helical coil of flow line may be carried externally of the hull, the coil 70' being slightly modified, as shown in FIG. 8. The upper end of flow line 54 is similarly connected to hull 22 by tension link 76' to relieve tension on coil 70'.

Figure 9:
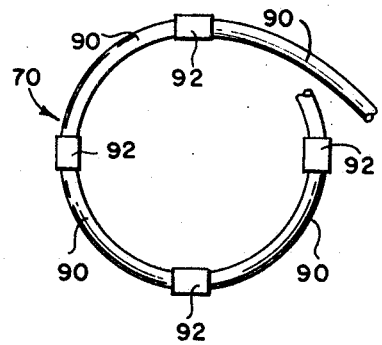
FIG. 9 is a detail showing a method for constructing the flow line coil of FIGS. 7 and 8.

In either of the embodiments shown in FIGS. 7 and 8, the coil of flow line can be constructed either from a continuous length of tubing rolled in the form of a helix or as shown in FIG. 9, it may be constructed from a plurality of pipe elbows 90 interconnected at 92' to form a continuous coil 70.

By way of example, and without any intention to be limited thereto, a 7-inch diameter flow line would require approximately a 3-turn coil 70 having a diameter of about 50 feet to accommodate the angular motion of the platform relative to the flow line.

Thus it can be seen that the invention provides a new and improved stable, floating marine platform that remains habitable and operational under all sea conditions, especially resonance conditions, and a flow line system that remains intact between the platform and underwater well head despite the conditions of the sea.

This invention in its broader aspects is not limited to the specific details shown and described and departures may be made from such details without departing from the principles of the invention and without sacrificing its chief advantages.

What is claimed is:

1. A stabilized floating marine platform comprising an elongated, substantially symmetrical hull of draft such that its lower portion is below the zone of significant vertical wave motion and a size such that its natural period of oscillation in pitch and heave is greater than the period of the waves of maximum energy to which the platform may be exposed; a plurality of upper, vertically and radially extending damping plates, spaced around the periphery of the upper side walls of the hull, at least a part of each of said plates being located below the still water line of the hull; a plurality of lower, vertically and radially extending damping plates spaced around the periphery of the lower side walls of the hull; and a horizontal damping plate extending radially outward from the lower portion of the hull whereby the pitching and heaving motions of the platform caused by waves having a period at or near the natural periods of oscillation of the platform are dampened by said plates so that resonance cannot occur.

2. The platform of claim 1, in which the upper and lower damping plates are rectangular, the long dimension of the plates extending in a vertical direction.

3. The platform of claim 1, in which the hull is a cylinder having a substantially constant circular cross section and includes eight upper and eight lower damping plates circumferentially spaced around the cylindrical hull at their respective areas.

4. The platform of claim 1, in which the lower end of the lower plates abut the upper surface of the horizontal damping plate.

5. The platform of claim 1, in which the horizontal damping plate is circular and is secured to the bottom of the hull.

6. The platform of claim 2, in which the upper damping plates are approximately twice the length of the lower damping plates.

References Cited

UNITED STATES PATENTS 2,107,886 2/1938 Creed.
3,191,388 6/1965 Ludwig.

TRYGVE M. BLIX, Primary Examiner

U.S. Cl. X.R.

9—8